(12) United States Patent
Harrell et al.

(10) Patent No.: US 6,183,580 B1
(45) Date of Patent: Feb. 6, 2001

(54) PROTECTIVE COVERING SYSTEM

(76) Inventors: Larry B. Harrell; Eleanor P. Harrell, both of 113 Duval Rd. Southeast, Winter Haven, FL (US) 33884

(*) Notice: Under 35 U.S.C. 154(b), the term of this patent shall be extended for 0 days.

(21) Appl. No.: 09/146,558

(22) Filed: Sep. 3, 1998

(51) Int. Cl.[7] ............................... B60J 1/00; B65D 65/02
(52) U.S. Cl. ........................ 156/108; 150/166; 150/168; 156/344; 280/770; 428/38; 428/80; 428/192
(58) Field of Search ........................... 156/108, 344; 428/38, 80, 192; 150/166, 168; 280/770

(56) References Cited

U.S. PATENT DOCUMENTS

| | | | |
|---|---|---|---|
| 3,140,115 | * 7/1964 | Bliss | 150/168 |
| 5,280,989 | * 1/1994 | Castillo | 280/770 |
| 5,747,132 | * 5/1998 | Matsui et al. | 150/166 |
| 5,820,201 | * 10/1998 | Jabalee | 150/166 |

* cited by examiner

Primary Examiner—Deborah Jones
Assistant Examiner—Robert R. Koehler

(57) ABSTRACT

A protective covering system for protecting the exterior of a vehicle including the paint surfaces and glass surface of the vehicle from damage from rocks, insects, road tar, and other debris while driving. The protective covering system includes a set of protective sheets with each protective sheet having front and back surfaces, and an outer perimeter. Each protective sheet is generally transparent to permit the passage of light therethrough between the front and back surfaces of the protective sheet. The back surface of each of the protective sheet is designed for attachment to an exterior surface of a vehicle.

14 Claims, 3 Drawing Sheets

PROTECTIVE COVERING SYSTEM

BACKGROUND OF THE INVENTION

1. Field of the Invention

The present invention relates to systems for protecting the exterior of a vehicle from damage when driving and more particularly pertains to a new protective covering system for protecting the exterior of a vehicle including the paint surfaces and glass surface of the vehicle from damage from rocks, insects, road tar, and other debris while driving.

2. Description of the Prior Art

The use of systems for protecting the exterior of a vehicle from damage when driving is known in the prior art. More specifically, systems for protecting the exterior of a vehicle from damage when driving heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,425,733; U.S. Pat. No. 5,253,448; U.S. Pat. No. 4,829,702; U.S. Pat. No. 4,031,654; U.S. Pat. No. Des. 325,613; and U.S. Pat. No. 4,862,638.

While these devices fulfill their respective, particular objectives and requirements, the aforementioned patents do not disclose a new protective covering system. The inventive device includes a set of protective sheets with each protective sheet having front and back surfaces, and an outer perimeter. Each protective sheet is generally transparent to permit the passage of light therethrough between the front and back surfaces of the protective sheet. The back surface of each of the protective sheet is designed for attachment to an exterior surface of a vehicle.

In these respects, the protective covering system according to the present invention substantially departs from the conventional concepts and designs of the prior art, and in so doing provides an apparatus primarily developed for the purpose of protecting the exterior of a vehicle including the paint surfaces and glass surface of the vehicle from damage from rocks, insects, road tar, and other debris while driving.

SUMMARY OF THE INVENTION

In view of the foregoing disadvantages inherent in the known types of systems for protecting the exterior of a vehicle from damage when driving now present in the prior art, the present invention provides a new protective covering system construction wherein the same can be utilized for protecting the exterior of a vehicle including the paint surfaces and glass surface of the vehicle from damage from rocks, insects, road tar, and other debris while driving.

The general purpose of the present invention, which will be described subsequently in greater detail, is to provide a new protective covering system apparatus and method which has many of the advantages of the systems for protecting the exterior of a vehicle from damage when driving mentioned heretofore and many novel features that result in a new protective covering system which is not anticipated, rendered obvious, suggested, or even implied by any of the prior art systems for protecting the exterior of a vehicle from damage when driving, either alone or in any combination thereof.

To attain this, the present invention generally comprises a set of protective sheets with each protective sheet having front and back surfaces, and an outer perimeter. Each protective sheet is generally transparent to permit the passage of light therethrough between the front and back surfaces of the protective sheet. The back surface of each of the protective sheet is designed for attachment to an exterior surface of a vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new protective covering system apparatus and method which has many of the advantages of the systems for protecting the exterior of a vehicle from damage when driving mentioned heretofore and many novel features that result in a new protective covering system which is not anticipated, rendered obvious, suggested, or even implied by any of the prior art systems for protecting the exterior of a vehicle from damage when driving, either alone or in any combination thereof.

It is another object of the present invention to provide a new protective covering system which may be easily and efficiently manufactured and marketed.

It is a further object of the present invention to provide a new protective covering system which is of a durable and reliable construction.

An even further object of the present invention is to provide a new protective covering system which is susceptible of a low cost of manufacture with regard to both materials and labor, and which accordingly is then susceptible of low prices of sale to the consuming public, thereby making such protective covering system economically available to the buying public.

Still yet another object of the present invention is to provide a new protective covering system which provides in the apparatuses and methods of the prior art some of the advantages thereof, while simultaneously overcoming some of the disadvantages normally associated therewith.

Still another object of the present invention is to provide a new protective covering system for protecting the exterior of a vehicle including the paint surfaces and glass surface of the vehicle from damage from rocks, insects, road tar, and other debris while driving.

Yet another object of the present invention is to provide a new protective covering system which includes a set of protective sheets with each protective sheet having front and back surfaces, and an outer perimeter. Each protective sheet is generally transparent to permit the passage of light therethrough between the front and back surfaces of the protective sheet. The back surface of each of the protective sheet is designed for attachment to an exterior surface of a vehicle.

Still yet another object of the present invention is to provide a new protective covering system that is transparent so that a driver in a vehicle may see through the protective covering system when attached to the exterior glass surfaces of the vehicle and such that the exterior paint surfaces of the vehicle are not obscured from view.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
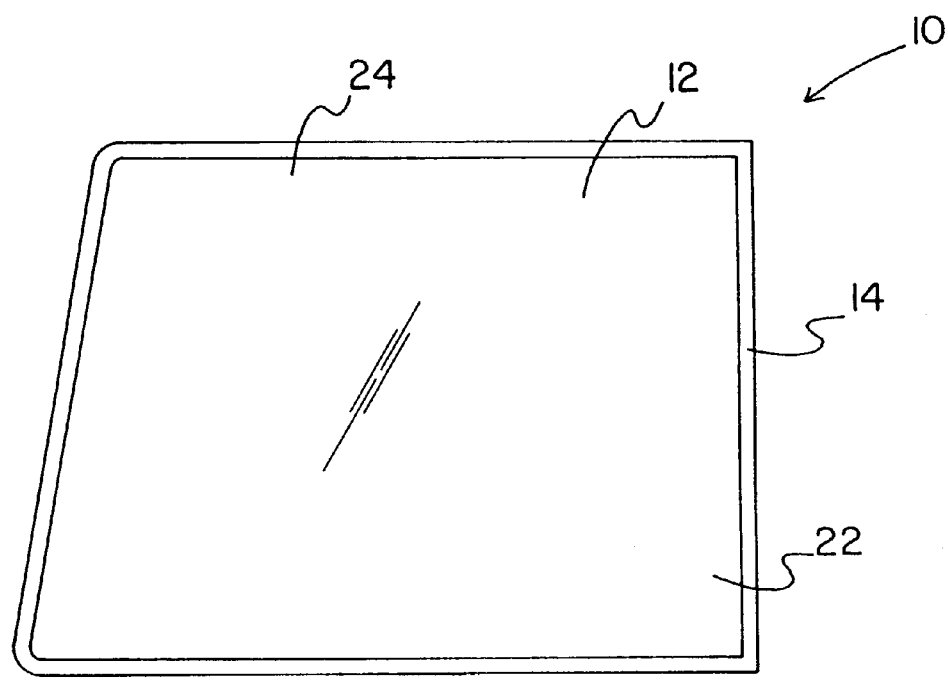
FIG. 1 is a schematic back side view of a protective sheet of a new protective covering system according to the present invention.
Figure 2:
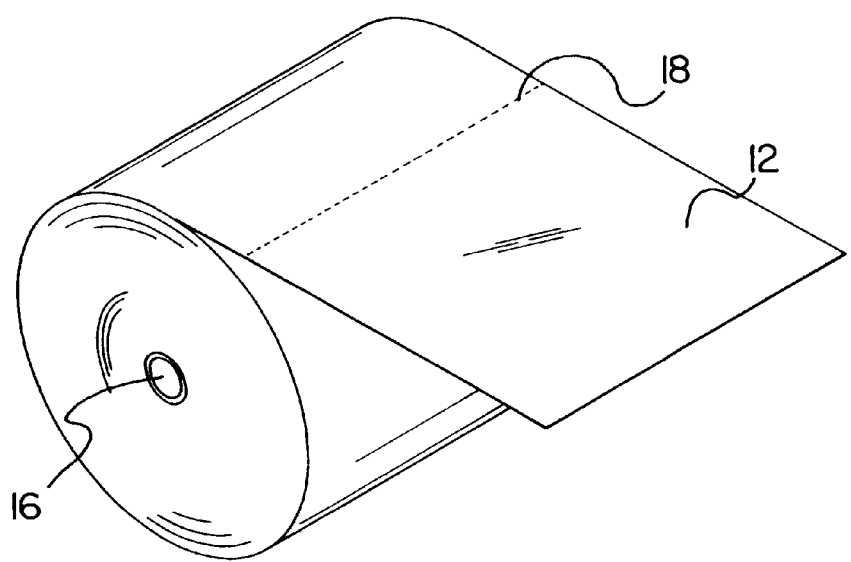
FIG. 2 is a schematic perspective view of a roll of protective sheets of the present invention.

With reference now to the drawings, and in particular to FIGS. 1 through 7 thereof, a new protective covering system embodying the principles and concepts of the present invention and generally designated by the reference numeral 10 will be described.

As best illustrated in FIGS. 1 through 7, the protective covering system 10 generally comprises a set of protective sheets with each protective sheet 12 having front and back surfaces 20,22, and an outer perimeter. Each protective sheet 12 is generally transparent to permit the passage of light therethrough between the front and back surfaces 20,22 of the protective sheet 12. The back surface 22 of each of the protective sheet 12 is designed for attachment to an exterior surface of a vehicle 1.

The protective covering system is designed for protecting the exterior of a vehicle 1 including the exterior painted surfaces and exterior glass surface of the vehicle 1 from damage from rocks, insects, road tar, and other debris while driving. Specifically, each protective sheet 12 of the set of protective sheets has generally flat front and back surfaces 20,22, and an outer perimeter. Each protective sheet 12 is generally transparent to permit the passage of light therethrough between the front and back surfaces 20,22 of the protective sheet 12. The back surface 22 of each of the protective sheet 12 is designed for attachment to an exterior surface of a vehicle 1. An adhesive is provided on the back surface 22 of each of the protective sheets 12 for adhesively attaching the back surface 22 of the protective sheet 12 to the exterior surface of the vehicle 1. Preferably, the adhesive comprises a generally transparent adhesive material such that visibility through the protective sheets 12 is not hindered by the adhesive. Ideally, the adhesive comprises an adhesive material designed for peelable removal from painted exterior surfaces of a vehicle 1 without damaging the painted exterior surfaces and without leaving a visibly detectable residue on the painted exterior surface when removed from the painted exterior surfaces. The adhesive should also ideally comprise an adhesive material designed for peelable removal from metallic exterior surfaces of a vehicle 1 (including chromed surfaces) without damaging the metallic exterior surfaces and without leaving a visibly detectable residue on the metallic exterior surface when removed from the metallic exterior surfaces. Thirdly, the adhesive ideally comprises an adhesive material designed for peelable removal from glass exterior surfaces of a vehicle 1 without damaging the glass exterior surfaces and without leaving a visibly detectable residue on the glass exterior surface when removed from the glass exterior surfaces.

The back surface 22 of each protective sheet 12 has a nonstick peripheral region 14 extending around the outer perimeter of the respective protective sheet 12. The non-stick peripheral region 14 defines a central region 24 of the back surface 22 on which the adhesive is located. The non-stick peripheral region is designed for aiding the peelable removal of the protective sheet 12 from the exterior surface of the vehicle 1 by the finger tips of a user.

Figure 3:
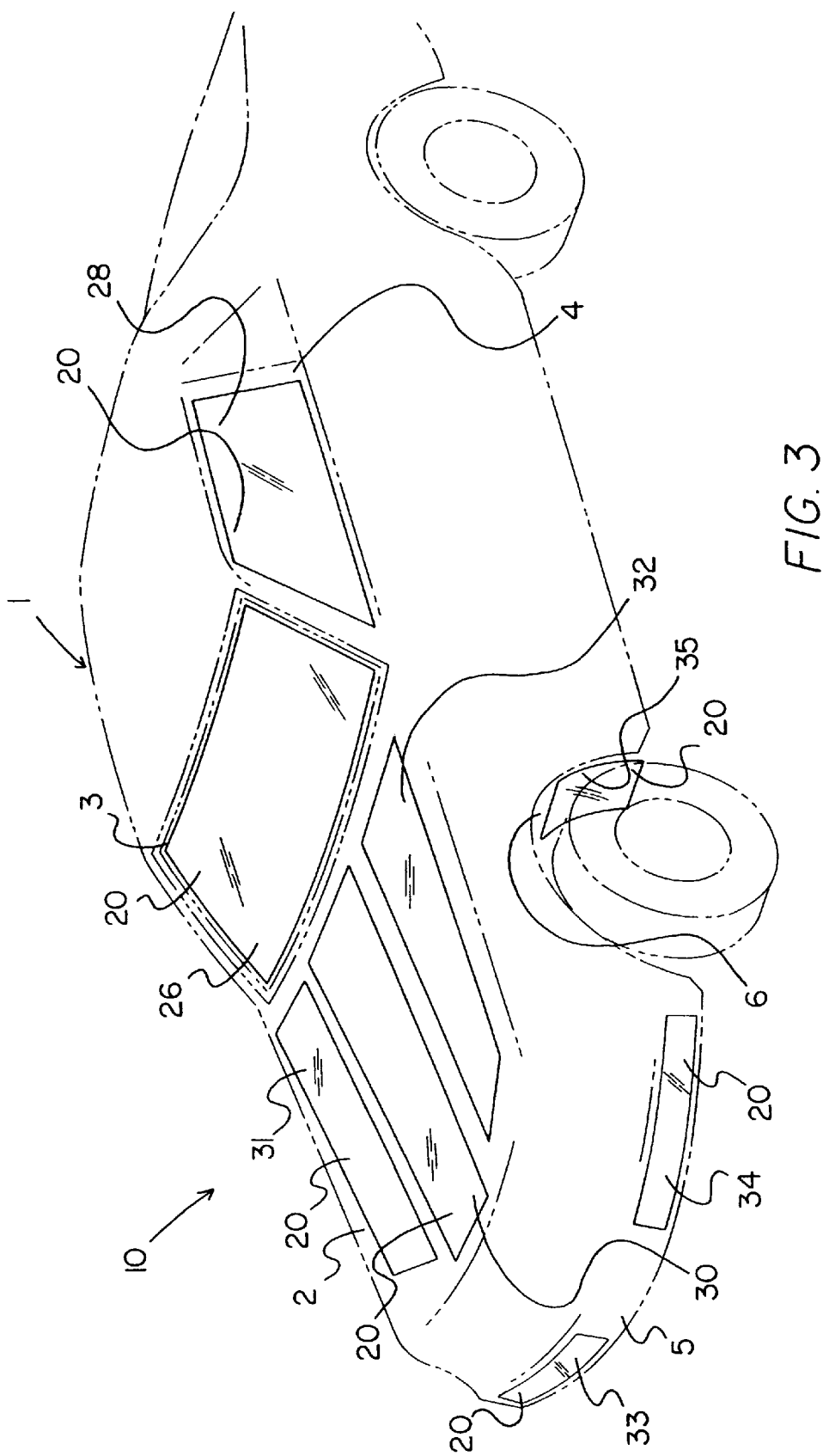
FIG. 3 is a schematic perspective view of the present invention covering portions of the exterior of a vehicle.
Figure 4:
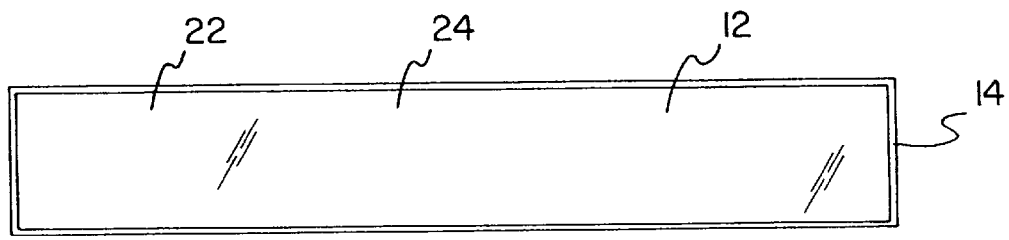
FIG. 4 is a schematic back side view of rectangular embodiment of the present invention.
Figure 5:
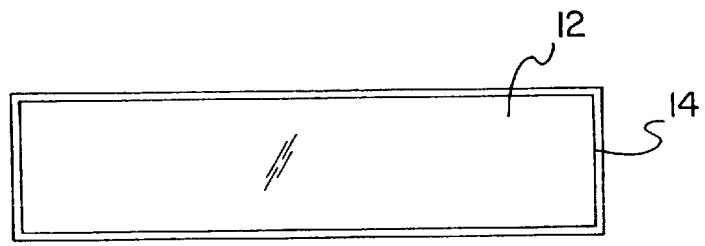
FIG. 5 is a schematic back side view of another rectangular embodiment of the present invention.
Figure 6:
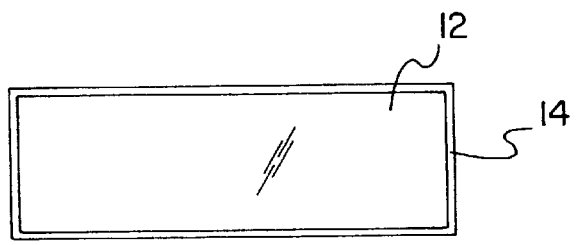
FIG. 6 is a schematic back side view of a third rectangular embodiment of the present invention.
Figure 7:
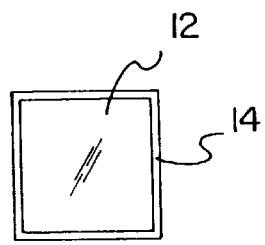
FIG. 7 is a schematic back side view of fourth rectangular embodiment of the present invention.

The set of protective sheets 12 preferably includes glass surface protective sheets 26,28 including a front windshield protective sheet 26 and at least two side window protective sheets 28. As illustrated in FIG. 3, the front windshield protective sheet 26 is configured for attachment to the exterior of a front windshield 3 of a vehicle 1 to substantially cover the front windshield 3 of the vehicle 1 to protect the exterior of the front windshield 3 of the vehicle 1 from damage from debris. Ideally, the outer perimeter of the front windshield protective sheet 26 is generally trapezoidal in shape and has generally parallel upper and lower edges. Each of the side window protective sheets 28 is configured for attachment to the exterior of a side window 4 of a vehicle 1 to substantially cover the exterior of the side window 4 of the vehicle 1 to protect the exterior of the side window of the vehicle 1 from damage from debris. Ideally, the outer perimeter of each of the side window protective sheets 28 is generally trapezoidal in shape and has generally parallel upper and lower edges, and a side edge extending generally perpendicular to the upper and lower edges of the respective side window sheet.

In the preferred embodiment, a number of protective sheets 12 of the set of protective sheets 12 are tinted (that is, have tinting) to reduce the transparency of the protective sheet 12 such that a portion of the light passing through the protective sheet 12 is blocked by the tinting. Even more preferably, the glass surface protective sheets 26,28 are tinted.

With reference to FIG. 3, the set of protective sheets 12 also preferably includes a plurality of hood protective sheets 30,31,32, a plurality of bumper protective sheets 33,34, and a plurality of wheel well protective sheets 35. The hood protective sheets 30,31,32 are configured for covering an exterior portion of a hood 2 of a vehicle 1 such that together the hood protective sheets 30,31,32 substantially cover the exterior of the hood of the vehicle 1 to protect the exterior of the hood of the vehicle 1 from damage from debris. The hood protective sheets 30,31,32 preferably include a center hood protective sheet 30 and a pair of side hood protective sheets 31,32. The center hood protective sheet 30 is generally rectangular in shape and designed for attachment to the exterior of a central region of the hood of the vehicle 1. The side hood protective sheets 31,32 are designed for attachment to the exterior of the hood of the vehicle 1 on either side of the center hood protective sheet 30. Ideally, the side hood protective sheets 31,32 are each quadrilateral in shape and have a pair of end edges and a pair of side edges with the side edges converging together towards one of the end edges of the respective side hood protective sheet 31,32.

The bumper protective sheets 33,34 are configured for attachment to the exterior of a bumper 5 of a vehicle 1. The bumper protective sheets 33,34 are each generally rectangular and has a length and a width. Ideally, the length of each of the bumper protective sheets 33,34 is at least three times greater than the width of the respective bumper protective sheet 33,34. The wheel well protective sheets 35 are configured for attachment to a portion of a wheel well of a vehicle 1 behind the associated wheel of the vehicle 1. Preferably, each wheel well protective sheet 35 is generally rectangular and has a length and a width. Ideally, the length of each wheel well protective sheet 35 is at least twice the width of the respective wheel well protective sheet 35.

In use, the back surface 22 of the front windshield protective sheet 26 is attached to the exterior of the front windshield 3 of a vehicle 1 to substantially cover the front windshield 3 of the vehicle 1 with the front windshield protective sheet 26. The back surface 22 of each of the side window protective sheets 28 is attached to the exterior of an associated side window of the vehicle such that one of the side window protective sheets 28 substantially covers the exterior of one side window 4 of the vehicle and another of the side window protective sheets substantially covers the exterior of another side window of the vehicle. The back surfaces of the hood protective sheets 30,31,32 are attached to the exterior of the hood 2 of the vehicle 1 to such that the center hood protective sheet 30 substantially covers a central region of the exterior of the hood of the vehicle 1 and the side hood protective sheets 31,32 cover exterior portions of the hood 2 of the vehicle 1 on either side of the center hood protective sheet 30. The back surfaces 22 of the bumper protective sheets 33,34 are attached to the exterior of the bumper 5 of the vehicle 1. Preferably, one of the bumper protective sheets is positioned towards one side of the vehicle and the other bumper protective sheet is positioned towards another side of the vehicle. In use, a wheel well protective sheet 35 is attached to each of the wheel wells 6 of the vehicle 1 such that each wheel well protective sheets 35 is positioned in the respective wheel well 6 of the vehicle 1 behind the associated wheel of the vehicle 1.

To remove any of the protective sheets from the exterior of the vehicle a user simply grasps peripheral region 14 of the protective sheet 12 with their fingers to peel the protective sheet 12 off of the exterior surface of the vehicle 1.

The protective sheets 12 can be disposed on a roll 16. Note FIG. 2. The protective sheets 12, in this form, includes a plurality of perforated lines 18 to facilitate separation of the protective sheets 12 into segments. The plurality of perforated lines 18 are spaced at varying lengths to generate segments of differing widths. Note FIGS. 4–7. In use, the present invention would be applied to the windshield, front end surfaces, and even certain areas of the lower body panels of a vehicle. The main purpose of this product is to protect the windshield and other key surfaces and keep them free of dead insects, road tar, bird droppings, and possibly even scratches or chips caused by small stones. The roll could be made in various lengths and in widths ranging from 6 to 36 inches. The present invention would be applied to the vehicle via the clear adhesive. The user would simply cut or tear the protective sheets 12 to fit the surfaces he wanted to protect. The protective sheets 12 would then act as a barrier between insects, tar, stones, and other things which could dirty or damage the actual surface of the vehicle. When the protective sheets 12 became worn or well covered with dead bugs, etc., the user could simply peel the protective sheets 12 off, dispose of it, and apply a new protective sheets 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A protective covering system for protecting the exterior of a vehicle, said protective covering system comprising:

a set of protective sheets;

wherein each protective sheet has front and back surfaces, and an outer perimeter;

each protective sheet being generally transparent to permit the passage of light therethrough between said front and back surfaces of said protective sheet;

said back surface of each of said protective sheet being for attachment to an exterior surface of a vehicle;

wherein an adhesive is provided on said back surface of each of said protective sheets, said adhesive being for adhesively attaching said back surface of said protective sheet to the exterior surface of the vehicle; and wherein said adhesive comprises an adhesive material being peelably removable from painted exterior surfaces of the vehicle without damaging the painted exterior surfaces and without leaving a visibly detectable residue on the painted exterior surface when removed from the painted exterior surfaces, wherein said adhesive comprises an adhesive material being peelably removable from metallic exterior surfaces of the vehicle without damaging the metallic exterior surfaces and without leaving a visibly detectable residue on the metallic exterior surface when removed from the metallic exterior surfaces, and wherein said adhesive comprises an adhesive material being peelably removable from glass exterior surfaces of the vehicle without damaging the glass exterior surfaces and without leaving a visibly detectable residue on the glass exterior surface when removed from the glass exterior surfaces.

2. The protective covering system of claim 1, wherein said adhesive comprises a generally transparent adhesive material such that visibility through the protective sheets is not hindered by said adhesive.

3. The protective covering system of claim 1, wherein said back surface of each protective sheet has a non-stick peripheral region extending around said outer perimeter of the respective protective sheet, said non-stick peripheral region defining a central region of said back surface, said adhesive being located on said central region, said non-stick peripheral region being for aiding the peelable removal of the protective sheet from the exterior surface of the vehicle by the finger tips of a user.

4. The protective covering system of claim 1, wherein said set of protective sheets includes glass surface protective sheets, said glass surface protective sheets including a front windshield protective sheet, and at least two side window protective sheets, wherein said front windshield protective sheet is configured for attachment to the exterior of a front windshield of a vehicle to substantially cover the exterior of the front windshield of the vehicle to protect the exterior of the front windshield of the vehicle from damage from debris, wherein each of said side window sheets is configured for attachment to the exterior of a side window of a vehicle to substantially cover the exterior of the side window of the vehicle to protect the exterior of the side window of the vehicle from damage from debris.

5. The protective covering system of claim 1, wherein a number of protective sheets of said set of protective sheets are tinted such that a portion of the light passing through said protective sheet is blocked by the tinting, wherein said glass surface protective sheets are tinted.

6. The protective covering system of claim 1, wherein said set of protective sheets includes a plurality of hood protective sheets, said hood protective sheets being configured for covering an exterior portion of a hood of a vehicle such that together said hood protective sheets substantially cover the exterior of the hood of the vehicle to protect the exterior of the hood of the vehicle from damage from debris, said hood protective sheets including a center hood protective sheet and a pair of side hood protective sheets, said center hood protective sheet being generally rectangular in shape and being for attachment to the exterior of a central region of the hood of the vehicle, said side hood protective sheets being for attachment to the exterior of the hood of the vehicle on either side of the center hood protective sheet, said side hood protective sheets being quadrilateral in shape having a pair of end edges and a pair of side edges, said side edges converging together towards one of said end edges of the respective side hood protective sheet.

7. The protective covering system of claim 1, wherein said adhesive comprises a generally transparent adhesive material such that visibility through the protective sheets is not hindered by said adhesive;

said back surface of each protective sheet, having a non-stick peripheral region extending around said outer perimeter of the respective protective sheet, said non-stick peripheral region defining a central region of said back surface, said adhesive being located on said central region, said non-stick peripheral region being for aiding the peelable removal of the protective sheet from the exterior surface of the vehicle by the finger tips of a user;

wherein said set of protective sheets includes glass surface protective sheets, said glass surface protective sheets including a front windshield protective sheet, and at least two side window protective sheets;

said front windshield protective sheet being configured for attachment to the exterior of a front windshield of the vehicle to substantially cover the front windshield of the vehicle to protect the exterior of the front windshield of the vehicle from damage from debris;

wherein said outer perimeter of said front windshield protective sheet is generally trapezoidal in shape and has generally parallel upper and lower edges;

each of said side window sheets being configured for attachment to the exterior of a side window of the vehicle to substantially cover the exterior of the side window of the vehicle to protect the exterior of the side window of the vehicle from damage from debris;

wherein said outer perimeter of each of said side window protective sheets is generally trapezoidal in shape and has generally parallel upper and lower edges, side edges extending generally perpendicular to said upper and lower edges of the respective side window sheet;

wherein a number of protective sheets of said set of protective sheets are tinted such that a portion of the light passing through said protective sheet is blocked by the tinting, wherein said glass surface protective sheets are tinted;

wherein said set of protective sheets includes a plurality of hood protective sheets, a plurality of bumper protective sheets, and a plurality of wheel well protective sheets;

said hood protective sheets being configured for covering an exterior portion of a hood of the vehicle such that together said hood protective sheets substantially cover the exterior of the hood of the vehicle to protect the exterior of the hood of the vehicle from damage from debris;

said hood protective sheets including a center hood protective sheet and a pair of side hood protective sheets, said center hood protective sheet being generally rectangular in shape and being for attachment to the exterior of a central region of the hood of the vehicle, said side hood protective sheets being being for attachment to the exterior of the hood of the vehicle on either side of the center hood protective sheet;

said side hood protective sheets being quadrilateral in shape having a pair of end edges and a pair of side edges, said side edges converging together towards one of said end edges of the respective side hood protective sheet;

said bumper protective sheets being configured for attachment to the exterior of a bumper of the vehicle, said bumper protective sheets each being generally rectangular and having a length and a width, wherein said length of each of said bumper protective sheets being at least three times greater than said width of the respective bumper protective sheet; and said wheel well protective sheets being configured for attachment to a portion of a wheel well of vehicle behind the associated wheel of the vehicle, wherein each wheel well protective sheet being generally rectangular and having a length and a width, wherein said length of each wheel well protective sheet is at least twice the width of the respective wheel well protective sheet.

8. A method for protecting the exterior surfaces of a vehicle from damage from debris while driving, comprising the steps of:

providing a set of protective sheets;
wherein each protective sheet has generally flat front and back surfaces, and an outer perimeter;
each protective sheet being generally transparent to permit the passage of light therethrough between said front and back surfaces of said protective sheet;
said back surface of each of said protective sheet being adapted for attachment to an exterior surface of a vehicle, wherein an adhesive is provided on said back surface of each of said protective sheets, said adhesive being adapted for adhesively attaching said back surface of said protective sheet to the exterior surface of the vehicle;
wherein said adhesive comprises a generally transparent adhesive material such that visibility through the protective sheets is not hindered by said adhesive;
wherein said adhesive comprises an adhesive material adapted for peelable removal from painted exterior surfaces of a vehicle without damaging the painted exterior surfaces and without leaving a visibly detectable residue on the painted exterior surface when removed from the painted exterior surfaces;
wherein said adhesive comprises an adhesive material adapted for peelable removal from metallic exterior surfaces of a vehicle without damaging the metallic exterior surfaces and without leaving a visibly detectable residue on the metallic exterior surface when removed from the metallic exterior surfaces;
wherein said adhesive comprises an adhesive material adapted for peelable removal from glass exterior surfaces of a vehicle without damaging the glass exterior surfaces and without leaving a visibly detectable residue on the glass exterior surface when removed from the glass exterior surfaces;
said back surface of each protective sheet, having a nonstick peripheral region extending around said outer perimeter of the respective protective sheet, said non-stick peripheral region defining a central region of said back surface, said adhesive being located on said central region, said non-stick peripheral region being adapted for aiding the peelable removal of the protective sheet from the exterior surface of the vehicle by the finger tips of a user;
wherein said set of protective sheets includes glass surface protective sheets, said glass surface protective sheets including a front windshield protective sheet, and at least two side window protective sheets;
said front windshield protective sheet being configured for attachment to the exterior of a front windshield of a vehicle to substantially cover the front windshield of the vehicle to protect the exterior of the front windshield of the vehicle from damage from debris;
wherein said outer perimeter of said front windshield protective sheet is generally trapezoidal in shape and has generally parallel upper and lower edges;
each of said side window sheets being configured for attachment to the exterior of a side window of a vehicle to substantially cover the exterior of the side window of the vehicle to protect the exterior of the side window of the vehicle from damage from debris;
wherein said outer perimeter of each of said side window protective sheets is generally trapezoidal in shape and has generally parallel upper and lower edges, a side edges extending generally perpendicular to said upper and lower edges of the respective side window sheet;
wherein a number of protective sheets of said set of protective sheets are tinted such that a portion of the light passing through said protective sheet is blocked by the tinting, wherein said glass surface protective sheets are tinted;
wherein said set of protective sheets includes glass surface protective sheets, said glass surface protective sheets including a front windshield protective sheet, and at least two side window protective sheets;
wherein said set of protective sheets includes a plurality of hood protective sheets, a plurality of bumper protective sheets, and a plurality of wheel well protective sheets;
said hood protective sheets being configured for covering an exterior portion of a hood of a vehicle such that together said hood protective sheets substantially cover the exterior of the hood of the vehicle to protect the exterior of the hood of the vehicle from damage from debris;
said hood protective sheets including a center hood protective sheet and a pair of side hood protective sheets, said center hood protective sheet being generally rectangular in shape and adapted for attachment to the exterior of a central region of the hood of the vehicle, said side hood protective sheets being adapted for attachment to the exterior of the hood of the vehicle on either side of the center hood protective sheet;
said side hood protective sheets being quadrilateral in shape having a pair of end edges and a pair of side edges, said side edges converging together towards one of said end edges of the respective side hood protective sheet;
said bumper protective sheets being configured for attachment to the exterior of a bumper of a vehicle, said bumper protective sheets each being generally rectangular and having a length and a width, wherein said length of each of said bumper protective sheets being at least three times greater than said width of the respective bumper protective sheet; and
said wheel well protective sheets being configured for attachment to a portion of a wheel well of a vehicle behind the associated wheel of the vehicle, wherein each wheel well protective sheet being generally rectangular and having a length and a width, wherein said length of each wheel well protective sheet is at least twice the width of the respective wheel well protective sheet;

attaching the back surface of the front windshield protective sheet to the exterior of the front windshield of a vehicle to substantially cover the front windshield of the vehicle with said front windshield protective sheet;

attaching the back surface of each of the side window protective sheets to the exterior of an associated side window of the vehicle such that one of said side window protective sheets substantially covers the exterior of one side window of the vehicle and another of said side window protective sheets substantially covers the exterior of another side window of the vehicle;

attaching the back surfaces of the hood protective sheets to the exterior of the hood of the vehicle to such that the center hood protective sheet is substantially covers a central region of the exterior of the hood of the vehicle and the side hood protective sheets cover exterior portions of the hood of the vehicle on either side of the center hood protective sheet;

attaching the back surfaces of the bumper protective sheets to the exterior of the bumper of the vehicle, one of the bumper protective sheets being positioned towards one side of the vehicle, another of the bumper protective sheets being positioned towards another side of the vehicle; and attaching a wheel well protective sheet to each of the wheel wells of the vehicle such that each wheel well protective sheets is positioned in the respective wheel well of the vehicle behind the associated wheel of the vehicle.

9. A protective covering system for protecting the exterior of a vehicle, said protective covering system comprising:

a set of protective sheets;

wherein each protective sheet has front and back surfaces, and an outer perimeter;

each protective sheet being generally transparent to permit the passage of light therethrough between said front and back surfaces of said protective sheet; and said back surface of each of said protective sheet being for attachment to an exterior surface of a vehicle;

wherein a number of protective sheets of said set of protective sheets are tinted such that a portion of the light passing through said protective sheet is blocked by the tinting, wherein said glass surface protective sheets are tinted.

10. The protective covering system of claim 9, wherein said set of protective sheets includes glass surface protective sheets, said glass surface protective sheets including a front windshield protective sheet, and at least two side window protective sheets, wherein said front windshield protective sheet is configured for attachment to the exterior of a front windshield of a vehicle to substantially cover the exterior of the front windshield of the vehicle to protect the exterior of the front windshield of the vehicle from damage from debris, wherein each of said side window sheets is configured for attachment to the exterior of a side window of a vehicle to substantially cover the exterior of the side window of the vehicle to protect the exterior of the side window of the vehicle from damage from debris.

11. The protective covering system of claim 9, wherein said set of protective sheets includes a plurality of hood protective sheets, said hood protective sheets being configured for covering an exterior portion of a hood of a vehicle such that together said hood protective sheets substantially cover the exterior of the hood of the vehicle to protect the exterior of the hood of the vehicle from damage from debris, said hood protective sheets including a center hood protective sheet and a pair of side hood protective sheets, said center hood protective sheet being generally rectangular in shape and being for attachment to the exterior of a central region of the hood of the vehicle, said side hood protective sheets being for attachment to the exterior of the hood of the vehicle on either side of the center hood protective sheet, said side hood protective sheets being quadrilateral in shape having a pair of end edges and a pair of side edges, said side edges converging together towards one of said end edges of the respective side hood protective sheet.

12. A protective covering system for protecting the exterior of a vehicle, said protective covering system comprising:

a set of protective sheets;

wherein each protective sheet has front and back surfaces, and an outer perimeter;

each protective sheet being generally transparent to permit the passage of light therethrough between said front and back surfaces of said protective sheet;

said back surface of each of said protective sheet being for attachment to an exterior surface of a vehicle;

wherein an adhesive is provided on said back surface of each of said protective sheets, said adhesive being for adhesively attaching said back surface of said protective sheet to the exterior surface of the vehicle; and wherein said back surface of each protective sheet has a nonstick peripheral region extending around said outer perimeter of the respective protective sheet, said nonstick peripheral region defining a central region of said back surface, said adhesive being located on said central region, said non-stick peripheral region being for aiding the peelable removal of the protective sheet from the exterior surface of the vehicle by the finger tips of a user.

13. A protective covering system for protecting the exterior of a vehicle, said protective covering system comprising:

a set of protective sheets;

wherein each protective sheet has front and back surfaces, and an outer perimeter;

each protective sheet being generally transparent to permit the passage of light therethrough between said front and back surfaces of said protective sheet;

said back surface of each of said protective sheet being for attachment to an exterior surface of a vehicle; and wherein said set of protective sheets includes glass surface protective sheets, said glass surface protective sheets including a front windshield protective sheet, and at least two side window protective sheets, wherein said front windshield protective sheet is configured for attachment to the exterior of a front windshield of a vehicle to substantially cover the exterior of the front windshield of the vehicle to protect the exterior front windshield of the vehicle from damage from debris, wherein each of said side window sheets is configured for attachment to the exterior of a side window of a vehicle to substantially cover the exterior of the side window of the vehicle to protect the exterior of the side window of the vehicle from damage from debris.

14. A protective covering system for protecting the exterior of a vehicle, said protective covering system comprising:

a set of protective sheets;

wherein each protective sheet has front and back surfaces, and an outer perimeter;

each protective sheet being generally transparent to permit the passage of light therethrough between said front and back surfaces of said protective sheet;

said back surface of each of said protective sheet being for attachment to an exterior surface of a vehicle; and wherein said set of protective sheets includes a plurality of hood protective sheets, said hood protective sheets being configured for covering an exterior portion of a hood of a vehicle such that together said hood protective sheets substantially cover the exterior of the hood of the vehicle to protect the exterior of the hood of the vehicle from damage from debris, said hood protective sheets including a center hood protective sheet and a pair of side hood protective sheets, said center hood protective sheet being generally rectangular in shape and for attachment to the exterior of a central region of the hood of the vehicle, said side hood protective sheets being adapted for attachment to the exterior of the hood of the vehicle on either side of the center hood protective sheet, said side hood protective sheets being quadrilateral in shape having a pair of end edges and a pair of side edges, said side edges converging together towards one of said end edges of the respective side hood protective sheet.

* * * * *